US012803909B2

(12) United States Patent
Peng

(10) Patent No.: US 12,803,909 B2
(45) Date of Patent: Nov. 17, 2026

(54) ROUTING METHOD, ROUTING APPARATUS AND COMPUTER-READABLE STORAGE MEDIUM

(71) Applicant: ZTE CORPORATION, Shenzhen (CN)

(72) Inventor: Shaofu Peng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 75 days.

(21) Appl. No.: 17/788,044

(22) PCT Filed: Dec. 17, 2020

(86) PCT No.: PCT/CN2020/137232
§ 371 (c)(1),
(2) Date: Jun. 22, 2022

(87) PCT Pub. No.: WO2021/189993
PCT Pub. Date: Sep. 30, 2021

(65) Prior Publication Data
US 2023/0140531 A1 May 4, 2023

(30) Foreign Application Priority Data
Mar. 23, 2020 (CN) ......................... 202010207720.0

(51) Int. Cl.
*H04L 45/745* (2022.01)
*H04L 45/00* (2022.01)

(52) U.S. Cl.
CPC ............ *H04L 45/745* (2013.01); *H04L 45/22* (2013.01); *H04L 45/566* (2013.01)

(58) Field of Classification Search
None
See application file for complete search history.

(56) References Cited

U.S. PATENT DOCUMENTS

2005/0160184 A1 7/2005 Walsh et al.
2019/0081897 A1 3/2019 Shakir et al.
(Continued)

FOREIGN PATENT DOCUMENTS

CN 108429685 A 8/2018
CN 109218189 A 1/2019
CN 109688057 A 4/2019
CN 110557329 A 12/2019
CN 110830352 A 2/2020
(Continued)

OTHER PUBLICATIONS

Cheng, et al. "Generalized SRv6 Network Programming," Internet Engineering Task Force Spring Working Group, issued 2021, pp. 1-32.

(Continued)

*Primary Examiner* — Kevin S Mai
(74) *Attorney, Agent, or Firm* — Vivacqua Crane, PLLC

(57) ABSTRACT

A routing method, a routing apparatus and a non-transitory computer-readable storage medium are disclosed. The routing method may include, establishing a forwarding path to a destination node; generating, for each segment in the forwarding path, a compressed segment identifier according to a segment identifier corresponding to a respective one segment in the forwarding path, and establishing a compressed segment identifier list according to each compressed segment identifier; constructing an IPv6 message based on the compressed segment identifier list; and forwarding the IPv6 message.

11 Claims, 6 Drawing Sheets

(56) References Cited

U.S. PATENT DOCUMENTS

| | | | | |
|---|---|---|---|---|
| 2020/0076892 | A1* | 3/2020 | Surcouf | H04L 67/1001 |
| 2021/0092053 | A1* | 3/2021 | Filsfils | H04L 45/34 |
| 2022/0182323 | A1* | 6/2022 | Hu | H04L 45/748 |
| 2022/0255857 | A1* | 8/2022 | Li | H04L 45/745 |

FOREIGN PATENT DOCUMENTS

| | | | |
|---|---|---|---|
| CN | 111917640 | A | 11/2020 |
| EP | 3651423 | A1 | 5/2020 |
| EP | 3790236 | A1 | 3/2021 |
| WO | 2020010999 | A1 | 1/2020 |

OTHER PUBLICATIONS

International Searching Authority. International Search Report and Written Opinion for PCT Application No. PCT/CN2020/137232 and English translation, mailed Mar. 18, 2021, pp. 1-11.

Li, et al. "Compressed SRv6 Network Programming," Internet Engineering Task Force Spring Working Group, issued Jul. 22, 2019, pp. 1-15.

Decraene, B., et al. "SRv6 vSID: Network Programming extension for variable length SIDs," Internet Engineering Task Force Netowrk Working Group, issued 2020, pp. 1-34.

Li, Z., et al. "Compressed SRv6 Network Programming," Internet Engineering Task Force Spring Working Group, Feb. 2020, pp. 1-47.

Liu, Z. "An IPV6 header compression algorithm based on LoRa network," Information and Communication, Issue 7, 2017.

The State Intellectual Property Office of People's Republic of China. First Office Action for CN Application No. 2020102077200 and English translation, mailed Jul. 24, 2023, pp. 1-29.

The State Intellectual Property Office of People's Republic of China. First Search Report for CN Application No. 2020102077200 and English translation, mailed Jul. 20, 2023, pp. 1-7.

European Patent Office. Office Action for EP Application No. 20926436.5, mailed Sep. 18, 2024, pp. 1-7.

* cited by examiner

| | | |
|---|---|---|
| Node field | Function field | Parameter field |

FIG. 3

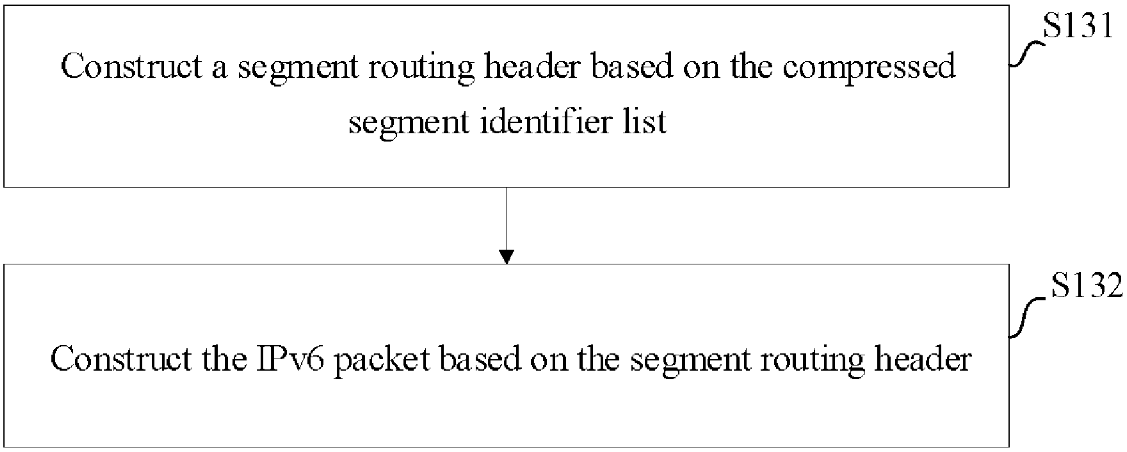

FIG. 4

<table>
<tr><td>Next Header</td><td>Hdr Ext Len</td><td></td><td>Routing Type</td><td>Segments Left</td></tr>
<tr><td>Last Entry</td><td>Flags</td><td>C</td><td colspan="2">Tag</td></tr>
<tr><td colspan="5">32bits-SID-N</td></tr>
<tr><td colspan="5">32bits-SID-N-1</td></tr>
<tr><td colspan="5">• • • • • •</td></tr>
<tr><td colspan="5">32bits-SID-3</td></tr>
<tr><td colspan="5">32bits-SID-2</td></tr>
<tr><td colspan="5">32bits-SID-1</td></tr>
<tr><td colspan="5">Optional Type Length Value objects(variable)</td></tr>
</table>

FIG. 5

| Type | Length |
|---|---|
| Swapped Block | |
| Swapped Block | |
| • • • • • • | |
| Swapped Block | |
| Swapped Block | |

| Type | Length |
|---|---|
| Swapped Block | |
| Swapped Block | |
| • • • • • • | |
| Swapped Block | |
| Swapped Block | |

ROUTING METHOD, ROUTING APPARATUS AND COMPUTER-READABLE STORAGE MEDIUM

CROSS-REFERENCE TO RELATED APPLICATION

This application is a national stage filing under 35 U.S.C. § 371 of international application number PCT/CN2020/137232, filed Dec. 17, 2020, which claims priority to Chinese patent application No. 202010207720.0, filed Mar. 23, 2020. The contents of these applications are incorporated herein by reference in their entirety.

TECHNICAL FIELD

The present disclosure relates to, but is not limited to, the technical field of communication, and in particular to a routing method, a routing apparatus and a non-transitory computer-readable storage medium.

BACKGROUND

Segment Routing (SR) is a routing method based on the source node, in which the source node attaches a piece of ordered instruction list information (i.e., Segment Identifier (SID) list information) to the data packet and thus shortest path forwarding segment by segment according to the ordered SID list information in the data plane can be achieved. In this method, a flow can be allowed to pass through any path and service chain only by maintaining the state of each flow on the source node, and the intermediate nodes and the endpoint node do not have to maintain the state of the flow.

SR can be applied to an IPv6 data plane, which is called SRv6. In some cases, when SR is applied to the IPv6 data plane, an ordered SID list will be superimposed on the data packet. This SID list is composed of IPv6 addresses, and the SID list is included in a new Segment Routing Header (SRH) defined on the basis of the RFC8200 standard. For SRv6, the SRH, when introduced into the packet header, shall contain a list of required IPv6 addresses (i.e., SID list). Therefore, the packet will have a relatively long segment routing header due to the long SID list, so that the payload efficiency of the packet will be seriously reduced or even the packet processing capability of the device will be exceeded. Thus, the deployment of the SRv6 in practical networks is limited to a large extent.

SUMMARY

The summary of the subject matter detailed herein will be given below. The summary is not intended to limit the protection scope of the claims.

The embodiments of the present disclosure provide a routing method, a routing apparatus and a non-transitory computer-readable storage medium.

In accordance with an aspect of the present disclosure, an embodiment provides a routing method, which may include, establishing a forwarding path to a destination node; generating, for each segment in the forwarding path, a compressed segment identifier according to a segment identifier corresponding to a respective one segment in the forwarding path, and establishing a compressed segment identifier list according to each compressed segment identifier; constructing an IPv6 packet based on the compressed segment identifier list; and, forwarding the IPv6 packet.

In accordance with another aspect of the present disclosure, an embodiment further provides a routing method, which may include, receiving an IPv6 packet constructed based on a compressed segment identifier list, the compressed segment identifier list including a plurality of compressed segment identifiers each corresponding to a respective one of segments in a forwarding path, the IPv6 packet including destination address information; matching a local segment identifier entry by table lookup for the destination address information; processing a compressed segment identifier corresponding to a subsequent segment in the compressed segment identifier list according to the local segment identifier entry and the destination address information to update the destination address information; constructing a new IPv6 packet based on the destination address information as updated; and, forwarding the new IPv6 packet.

In accordance with yet another aspect of the present disclosure, an embodiment further provides a routing apparatus, which may include, a memory, a processor and at least one computer program stored on the memory and executable by the processor which, when executed by the processor, causes the processor to implement any one of the routing methods as described above.

In accordance with yet another aspect of the present disclosure, an embodiment further provides a non-transitory computer-readable storage storing at least one computer-executable instruction which, when executed by a processor, causes the processor to execute any one of the routing methods as described above.

Other features and advantages of the present disclosure will be illustrated in the following specification, and will partially become apparent from the description or be appreciated by implementing the present disclosure. The objectives and other advantages of the present disclosure can be achieved and obtained by the structures specified in the description, the claims and the accompanying drawings.

BRIEF DESCRIPTION OF DRAWINGS

The accompanying drawings are provided for further understanding of the technical schemes of the present disclosure and constitute a part of this description. The accompanying drawings are intended to illustrate the technical schemes of the present disclosure in conjunction with the embodiments of the present disclosure, but are not intended to limit the technical schemes of the present disclosure.

FIG. 3 depicts a schematic diagram of a compressed segment identifier according to an embodiment of the present disclosure;

FIG. 4 depicts a flowchart of constructing an IPv6 packet in the routing method according to another embodiment of the present disclosure;

FIG. 5 depicts a schematic diagram of a segment routing header according to an embodiment of the present disclosure;

DETAILED DESCRIPTION

Figure 1:
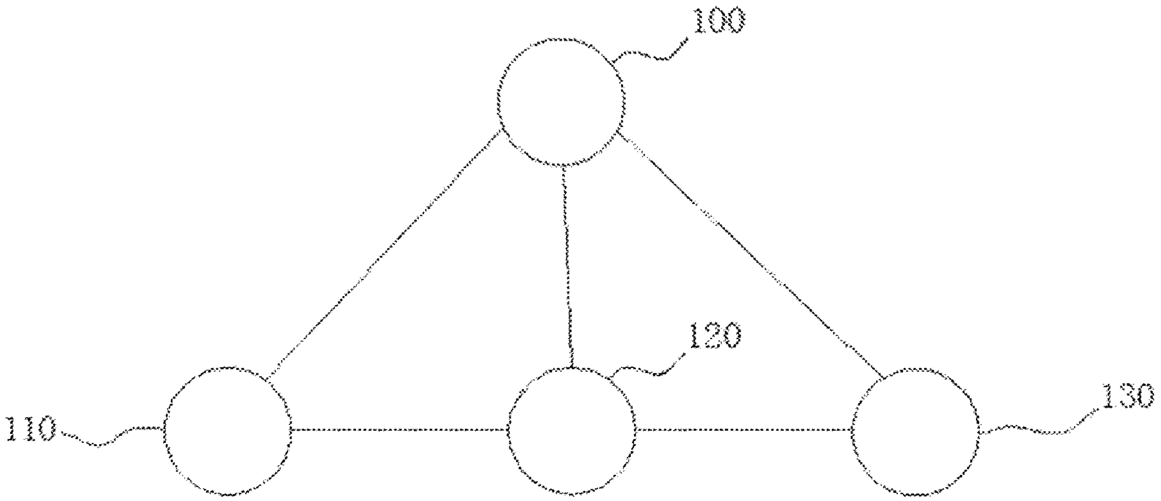
FIG. 1 depicts a schematic diagram of a network topology for executing a routing method according to an embodiment of the present disclosure.

The objectives, technical schemes, and advantages of the present disclosure would become apparent through the embodiments described in detail below in conjunction with the accompanying drawings. It should be understood that the specific embodiments described herein are illustrative, and are not intended to limit the present disclosure.

It is to be noted that, although the functional modules have been divided in the schematic diagrams of apparatuses and logical orders have been shown in the flowcharts, in some cases, the modules may be divided in a different manner, or the steps shown or described may be executed in an order different from those shown in the flowcharts. The terms such as "first" and "second" in the description, the claims and the accompanying drawings are intended to distinguish similar objects, and are not for indication of a specific sequence or a precedence order.

The embodiments of the present disclosure provide a routing method, a routing apparatus and a non-transitory computer-readable storage medium. Once a forwarding path to a destination node is established, a compressed segment identifier is generated by means of segment identifiers each corresponding to a respective one of the segments in the forwarding path, a compressed segment identifier list is then established according to the compressed segment identifiers, and an IPv6 packet for forwarding is constructed according to the compressed segment identifier list. Since the compressed segment identifier is formed by compressing a conventional segment identifier, compared with the conventional segment identifier in the SRv6, the compressed segment identifier has a smaller number of bits. Therefore, the IPv6 packet constructed based on the compressed segment identifier can have a shorter segment routing header as compared with the conventional IPv6 packet in the SRv6, so that the payload efficiency of the packet can be improved, and it is advantageous for the deployment of the SRv6 technique in practical networks. In addition, a border node may also construct a segment identifier with a new function type, which is defined as a block swapping flavored segment identifier in various embodiments of the present disclosure. The block swapping flavored segment identifier carries a function field that is indicative performing of locator block (SRv6 SID Locator Block) swapping. Once each node in the network advertises respective segment identifier information, the border node may construct a new local segment identifier entry with a locator block update parameter according to the block swapping flavored segment identifier. When the IPv6 packet constructed based on the compressed segment identifier is transferred from a current SRv6 domain to another SRv6 domain through the border node, a new destination address may be generated according to the compressed segment identifier and the locator block update parameter in the local segment identifier entry. Accordingly, the IPv6 packet based on the compressed segment identifier can be transferred from the current SRv6 domain to another SRv6 domain, and the SRv6 technology with higher packet payload efficiency can have a better performance in practical networks.

Some embodiments of the present disclosure will be further described below with reference to the accompanying drawings.

As shown in FIG. 1 which depicts a schematic diagram of a network topology for a routing method according to an embodiment of the present disclosure. In the example as shown in FIG. 1, the network topology includes a first node 110, a second node 120 and a third node 130 which are connected successively. In addition, the network topology further includes a network controller 100 which is connected to the first node 110, the second node 120 and the third node 130, respectively. The first node 110, the second node 120 and the third node 130 may be network devices such as routers or switches, and may forward packets. The network controller may be a Software Defined Network (SDN) controller, etc., and may control the first node 110, the second node 120 and the third node 130, respectively. In addition, the first node 110, the second node 120 and the third node 130 may be arranged in the same SRv6 domain, or different SRv6 domains.

The first node 110, the second node 120, the third node 130 and the network controller 110 each include a memory and a processor, where the memory and the processor may be connected via a bus or the like.

As a non-temporary computer-readable storage medium, the memory may be configured to store non-transitory software programs and non-transitory computer-executable programs. In addition, the memory may include high-speed random-access memories, or may include non-transitory memories, such as at least one disk memory device, flash memory devices or other non-transitory solid-state memory devices. In some implementations, the memory may optionally include memories remotely arranged relative to the processor, and these remote memories may be connected to the processor via a network. Examples of the network include, but are not limited to, Internet, Intranet, local area networks, mobile communication networks and combinations thereof.

The network topology and application scenario are described in the embodiment of the present disclosure to provide a description with details of the technical schemes for the embodiment of the present disclosure, and do not constitute any limitations to the technical schemes in the embodiment of the present disclosure. As known to those having ordinary skill in the art, with the evolution of the network topology and the emergence of new application scenarios, the technical schemes in the embodiment of the present disclosure are also applicable to similar technical problems.

It should be understood by those having ordinary skill in the art that, each node and topological structure shown in FIG. 1 do not constitute any limitations to the embodiments of the present disclosure, and more or less components than those shown, or combinations of some components or different component arrangements may be included.

In the network topology shown in FIG. 1, each node may separately call the stored routing programs to execute the routing method; or, the network controller may call the stored routing programs and cooperate with each node to execute the routing method.

Various embodiments of the routing method described in the present disclosure are provided based on the network topology and the structures of the nodes and the network controller in the network topology.

Figure 2:
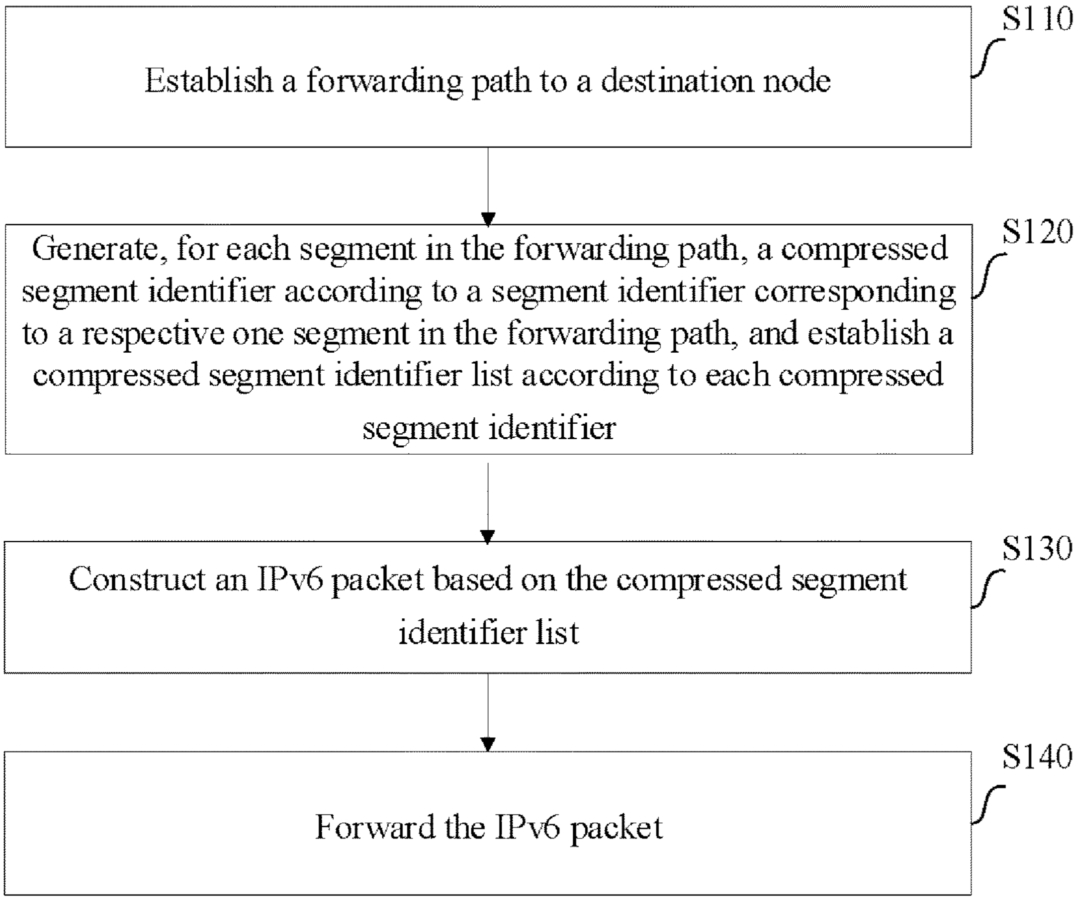
FIG. 2 depicts a flowchart of a routing method according to an embodiment of the present disclosure.

As shown in FIG. 2 which depicts a flowchart of a routing method according to an embodiment of the present disclosure. The routing method may be performed by the node in the network topology shown in FIG. 1, and the node which performs the routing method in the embodiment will be configured as a source node. The routing method includes, but is not limited to, S110, S120, S130 and S140.

At S110, a forwarding path to a destination node is established.

In an embodiment, the establishing of the forwarding path to the destination node may be performed through various manners, which will not be specifically limited in the embodiment. For example, the source node, according to the segment identifier information advertised by each node in the network, may calculate a Segment Routing Traffic Engineering (SR-TE) path from the source node to the destination node. For another example, the network controller, according to node information reported by each node in the network, may calculate an SR-TE path from the source node to the destination node. Subsequent packet forwarding operations can be performed based on the forwarding path thus established to the destination node.

At S120, a compressed segment identifier is generated according to a segment identifier corresponding to each segment in the forwarding path, and a compressed segment identifier list is established according to the compressed segment identifier.

In an embodiment, once the forwarding path to the destination node is established, a segment identifier corresponding to each segment in the forwarding path may be determined along the forwarding path. For example, in the network topology shown in FIG. 1, assuming that the first node 110 is the source node and the third node 130 is the destination node, the forwarding path from the first node 110 to the third node 130 is <the second node 120, the third node 130>, so that a second node segment identifier corresponding to the address of the second node 120 and a third node segment identifier corresponding to the address of the third node 130 may be obtained. It should be understood by those having ordinary skill in the art that the segment identifier corresponding to each segment in the forwarding path may be obtained according to the segment identifier information advertised by each node in the network. Once the segment identifier each corresponding to a respective one of segments in the forwarding path are determined, corresponding compressed segment identifiers may be generated according to these segment identifiers, and a compressed segment identifier list may be established according to these compressed segment identifiers, so that the length of a subsequently constructed segment routing header can be decreased, thus improving the payload efficiency of the packet.

In an embodiment, generating the compressed segment identifier according to the segment identifier corresponding to each segment in the forwarding path may be performed in various manners. For example, the compressed segment identifier may be generated by the node according to the segment identifier corresponding to each segment in the forwarding path. Alternatively, the compressed segment identifier may be generated by the network controller according to the segment identifier corresponding to each segment in the forwarding path, the embodiment is not limited to this.

In an embodiment, the establishing of the compressed segment identifier list according to the compressed segment identifiers may be performed in various manners. For example, the compressed segment identifiers may be arranged in a positive order to form the compressed segment identifier list, or the compressed segment identifiers may be arranged in a reversed order to form the compressed segment identifier list. The embodiment is not limited to this.

It should be understood by those having ordinary skill in the art that a conventional segment identifier has a length of 128 bits and generally includes a locator field and a function field. In some cases, an additional parameter field (argument field) may be divided from the function field, so that the structure of the conventional segment identifier may include a locator field, a function field and a parameter field. For the locator field in the conventional segment identifier, in the control plane protocol, a complete locator field may be represented as a combination of a block field and a node field, where the block field indicates the block information (Locator Block) in the current SRv6 domain, and the node field indicates the node information (Node) in the current SRv6 domain. The combination of the block field and the node field enables a node locating, so that other nodes in the network can locate this node by routing through the locator field and the node field.

It can be known from the above discussion of the conventional segment identifier that, for packets forwarded by the nodes in the same SRv6 domain, the segment identifier list formed by conventional segment identifiers contains plenty of repeated block information. Therefore, when the forwarding path is relatively long, that is, when the segment identifier list in the segment routing header is relatively long, the packet will have a longer segment routing header, thereby seriously reducing the payload efficiency of the packet.

In view of the above, an embodiment of the present disclosure creatively proposes a compressed segment identifier for forming a segment routing header and a method for packet forwarding based on the compressed segment identifier. The compressed segment identifier proposed in the embodiment will be described below in detail, and the method for packet forwarding based on the compressed segment identifier will be described in detail in subsequent embodiments.

As shown in FIG. 3, the structure of the compressed segment identifier in an embodiment is shown by way of an example. The compressed segment identifier at least includes a node field and a function field. In some embodiments, an additional parameter field may be divided from the function field, so as shown in FIG. 3, the compressed segment identifier may include a node field, a function field and a parameter field. The compressed segment identifier has a length of less than 128 bits. For example, the compressed segment identifier may have a length of 32 bits or 64 bits. The length of the compressed segment identifier may be selected according to practical application needs and will not be specifically limited in the embodiment. The node field indicates the node corresponding to the compressed segment identifier, the function field indicates the function to be realized by the node corresponding to the compressed segment identifier, and the parameter field indicates traffic or service related information.

Compared with the structure of the conventional segment identifier, the compressed segment identifier in the embodiment has only the node field and the function field, or has only the node field, the function field and the parameter field, so that the IPv6 packet constructed based on the compressed segment identifier has a shorter segment routing header. Accordingly, the payload efficiency of the packet can be improved, and it is advantageous for the deployment of the SRv6 technology in practical networks.

At S130, an IPv6 packet is constructed based on the compressed segment identifier list.

In an embodiment, once the compressed segment identifier list is established according to the compressed segment identifiers, a segment routing header is constructed according to the compressed segment identifier list and is encapsulated with IPv6 payload and an IPv6 packet header to form an IPv6 packet carrying the compressed segment identifier. Compared with the conventional IPv6 packet, the IPv6 packet constructed based on the compressed segment identifier has a shorter segment routing header, so that the payload efficiency of the packet can be improved, and it is advantageous for the deployment of the SRv6 technique in practical networks.

At S140, the IPv6 packet is forwarded.

In an embodiment, the compressed segment identifier carried by the forwarded IPv6 packet, can improve the forwarding efficiency of the packet to a certain extent under identical network conditions as compared with the conventional IPv6 packet, due to the compression of the segment identifier. Moreover, compared with the conventional IPv6 packet, the IPv6 packet constructed based on the compressed segment identifier has a shorter segment routing header, so that the payload efficiency of the packet can be improved, and it is advantageous for the deployment of the SRv6 technique in the practical networks.

In an embodiment, by means of the routing method including S110, S120, S130 and S140 as described above, the IPv6 packet forwarded in the network can have a shorter segment routing header, so that the payload efficiency of the packet can be improved, and it is advantageous for the deployment of the SRv6 technique in practical networks.

In addition, as shown in FIG. 4, in an embodiment, S130 includes, but is not limited to, the following S131 to S132.

At S131, a segment routing header is constructed based on the compressed segment identifier list.

At S132, an IPv6 packet is constructed based on the segment routing header.

In an embodiment, once the compressed segment identifier list is established according to the compressed segment identifiers, a segment routing header may be established based on the compressed segment identifier list and in combination with the related field information. Once the segment routing header is established, the segment routing header is combined with the IPv6 packet header and the IPv6 payload to construct a complete IPv6 packet. In some cases, since the segment routing header contains a list of required IPv6 addresses (i.e., a conventional segment identifier list), when the IPv6 address list is relatively long, the segment routing header will be too long, so that the payload efficiency of the packet will be reduced. In contrast, the segment routing header constructed based on the compressed segment identifier list in the embodiment can have a smaller length, so that the payload efficiency of the packet can be improved.

As shown in FIG. 5, FIG. 5 shows the structure of the segment routing header in the embodiment by way of an example. The segment routing header shown in FIG. 5 includes a segment identifier field which is indicative of the compressed segment identifier. In this embodiment, the compressed segment identifier having a length of 32 bits is illustrated by way of an example, and FIG. 5 shows segment identifiers from segment identifier 32bits-SID-1 to segment identifier 32bits-SIB-N, where N is a positive integer. As shown in FIG. 5, the segment identifiers 32bits-SID-1 to 32bits-SID-N shown as compressed segment identifiers form a compressed segment identifier list, and elements consisted in the compressed segment identifier list are compressed segment identifiers. In the compressed segment identifier list, adjacent elements are successively stored together in a reversed order. In particular, an uppermost element in the compressed segment identifier list corresponds to the last compressed segment identifier in the forwarding path, i.e., the segment identifier 32bits-SID-N; and, a lowermost element in the compressed segment identifier list corresponds to a first compressed segment identifier in the forwarding path, i.e., the segment identifier 32bits-SID-1. The 8-byte alignment of the entire segment routing header may be realized by the PAD TLV defined in the draft-ietf-6man-segment-routing-header-26. It is to be noted that, in some embodiments, when one 32-bit element is insufficient to represent one segment, two or more successive 32-bit elements may be combined to represent one segment having a complete meaning. For example, for a VPN service related segment, one 32-bit element may be insufficient to represent the meaning of this segment, so that a next 32-bit segment can further be used as a parameter field of the VPN service related segment.

It is to be noted that, in the structure of the segment routing header in the embodiment, except that the segment identifier field for representing the compressed segment identifier is different from the segment identifier field in the conventional segment routing header, other fields in the segment routing header in the embodiment have the same meanings as the corresponding fields contained in the conventional segment routing header and which will not be repeated here.

In addition, in an embodiment, the segment routing header includes a segment identifier bit-length flag bit and a Segment Left field. When the segment identifier bit-length flag bit is valid, the Segment Left field is indicative of the length of the compressed segment identifier.

In an embodiment, with reference to the structure of the segment routing header shown in FIG. 5, the segment routing header in the embodiment includes a segment identifier bit-length flag bit C and a Segment Left field. The segment identifier bit-length flag bit C may be arranged in a Flags field. When the segment identifier bit-length flag bit C is valid, it indicates that the length of each segment identifier field in the compressed segment identifier list contained in the segment routing header is the length of the compressed segment identifier, for example, a length of 32 bits of each segment identifier field. In this case, the Segment Left field and the Last Entry field of the segment routing header are indicative of the length of the compressed segment identifier, instead of the 128 bits in conventional cases.

Based on the structure of the compressed segment identifier in the embodiment shown in FIG. 3 and the structure of the segment routing header in the embodiment shown in FIG. 5, the method for packet forwarding based on the compressed segment identifier according to an embodiment of the present disclosure will be described in detail.

During forwarding of the IPv6 packet carrying the segment routing header constructed based on the compressed segment identifier, since the segment identifier bit-length flag bit C in the segment routing header is valid, data with the length of the compressed segment identifier, such as 32-bit of data is read from the compressed segment identifier list, that is, only one compressed identifier is read each time. In this case, it is to convert the compressed segment identifier into a conventional segment identifier with 128 bits, then copy the converted segment identifier with 128 bits into a Destination Address (DA) field in the IPv6 packet header, and combine the IPv6 packet header with the segment routing header and the IPv6 payload as described in this embodiment, to form the complete IPv6 packet carrying the compressed segment identifier. Subsequently, the IPv6 packet is forwarded to a next-hop node. Once the IPv6 packet reaches the next-hop node, the next-hop node may obtain corresponding block information according to the destination address in the DA field from the current IPv6 packet header, and may then obtain a new destination address by reading a next compressed segment identifier in the segment list and combining the block information with the read compressed segment identifier to construct a new IPv6 packet, so that the forwarding the IPv6 packet constructed based on the compressed segment identifier can be realized. Since the IPv6 packet carries the compressed segment identifier throughout the packet forwarding process, under identical network conditions, the IPv6 packet carrying the compressed segment identifier can improve the forwarding efficiency of the packet to a certain extent as compared to conventional IPv6 packets. Moreover, compared with the conventional IPv6 packet, the IPv6 packet constructed based on the compressed segment identifier has a shorter segment routing header, so that the payload efficiency of the packet can be improved, and it is advantageous for the deployment of the SRv6 technique in practical networks.

Figure 6:
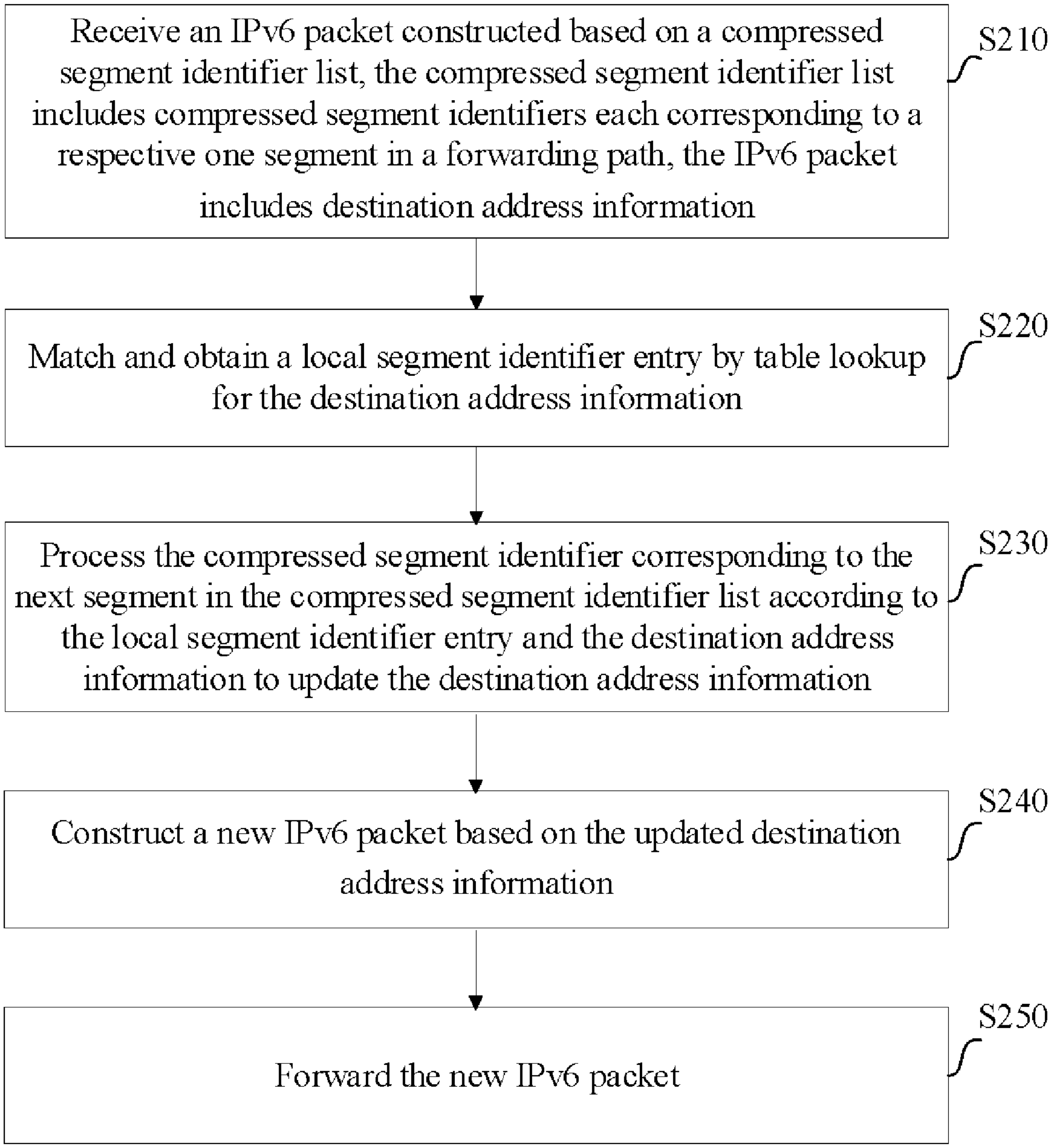
FIG. 6 depicts a flowchart of a routing method according to another embodiment of the present disclosure.

In addition, another embodiment of the present disclosure further provides a routing method. As shown in FIG. 6, which depicts a flowchart of a routing method according to another embodiment of the present disclosure. The routing method may also be performed by the nodes in the network topology shown in FIG. 1, and the node which performed the routing method in this embodiment will be configured as an intermediate node. The routing method includes, but is not limited to, S210, S220, S230, S140 and S250.

At S210, an IPv6 packet constructed based on a compressed segment identifier list is received, where the compressed segment identifier list includes compressed segment identifiers each corresponding to a respective one of segments in a forwarding path, and the IPv6 packet includes destination address information.

In an embodiment, when a source node forwards an IPv6 packet carrying the compressed segment identifiers to an intermediate node, the intermediate node may determine, according to the DA field in the IPv6 packet header, whether the destination address is matched, where the DA field in the IPv6 packet header stores the destination address information. When the destination address information in the DA field is matched with the address of a current node, the current node will receive the IPv6 packet constructed based on the compressed segment identifier list and perform related processing on the IPv6 packet for subsequent packet forwarding.

In an embodiment, a plurality of compressed segment identifiers are stored in the compressed segment identifier list, and each compressed segment identifier is in one-to-one correspondence to a respective one of the segments in the forwarding path. Therefore, the IPv6 address corresponding to each segment in the forwarding path can be obtained according to each compressed segment identifier in the compressed segment identifier list, thereby realizing the subsequent forwarding of the IPv6 packet.

It is to be noted that, the compressed segment identifier in this embodiment has the same structure and meaning as the compressed segment identifier in the embodiment shown in FIG. 3, and the structure and meaning of the compressed segment identifier in this embodiment may refer to the related description of the compressed segment identifier in the above embodiments and will not be repeated here to avoid repetition.

At S220, a local segment identifier entry is matched and obtained by table lookup according to the destination address information.

In an embodiment, once the IPv6 packet constructed based on the compressed segment identifier list is received, the destination address information in the IPv6 packet is acquired, and then a local segment identifier entry is matched by table lookup for the destination address information, for subsequent packet processing.

At S230, the compressed segment identifier corresponding to a next segment in the compressed segment identifier list is processed according to the local segment identifier entry and the destination address information to update the destination address information.

In an embodiment, each node in the network maintains one local segment identifier entry that is established according to the segment identifier information advertised by each node in the network, and the local segment identifier entry includes at least a locator parameter, a function parameter or the like. In some embodiments, the local segment identifier entry may further include a locator block (SRv6 SID Locator Block) update parameter. The locator block update parameter stores at least the block information in the segment identifier, which is indicative of the block information with locator block swapping performed.

In an embodiment, once a node receives an IPv6 packet, the node may convert, according to a local segment identifier entry maintained by this node and the destination address information stored in the DA field of the IPv6 packet header, the compressed segment identifier corresponding to a next segment stored in the segment routing header into new destination address information, for forwarding of the IPv6 packet to a next segment.

In an embodiment, the converting of the compressed segment identifier corresponding to the next segment according to the local segment identifier entry and the destination address information into new address information may be performed in various manners. For example, when the local segment identifier entry matched by table lookup according to the destination address information includes a locator parameter and a function parameter, and when the function parameter indicates locator block swapping is not to be performed, the block information of the next segment is obtained according to the destination address information in the current DA field, and the block information is combined with the compressed segment identifier corresponding to the next segment to obtain new destination address information. For another example, when the local segment identifier entry matched by table lookup according to the destination address information includes a locator parameter, a function parameter and a locator block update parameter, and when the function parameter indicates that locator block swapping is to be performed, the block information of the next segment is obtained by reading the content in the locator block update parameter, and the block information is combined with the compressed segment identifier corresponding to the next segment to obtain new destination address information. It is to be noted that the locator block update parameter may store only the content of the block information or the content of the next segment identifier, which will not be specifically limited in this embodiment and may be selected according to the practical situations. When the locator block update parameter stores the content of the next segment identifier, since the length of the block information is known, the block information after swapping may be obtained from the next segment identifier stored in the locator block update parameter.

Since the compressed segment identifier corresponding to the next segment can be converted into new destination address information according to the local segment identifier entry and the destination address information, thus enabling the condition and basis for the forwarding of the IPv6 packet carrying the compressed segment identifier in the networks. When the IPv6 packet carrying the compressed segment identifier is forwarded in the networks, since the IPv6 packet carrying the compressed segment identifier has a shorter segment routing header than the conventional IPv6 packet, the payload efficiency of the packet can be improved, and it is advantageous for the deployment of the SRv6 technique in practical networks.

At S240, a new IPv6 packet is constructed based on the updated destination address information.

In an embodiment, once the updated destination address information is obtained, a new IPv6 packet header may be obtained by copying the updated destination address information into the DA field of the IPv6 packet header, and the new IPv6 packet header, the segment routing header carrying the compressed segment identifier and the IPv6 payload may be encapsulated together to obtain an IPv6 packet header for next-hop forwarding. Since the IPv6 packet header for forwarding to the next segment carries the compressed segment identifier, the IPv6 packet constructed based on the compressed segment identifiers has a shorter segment routing header as compared with the conventional IPv6 packet, so that the payload efficiency of the packet can be improved, and it is advantageous for the deployment of the SRv6 technique in practical networks.

At S250, the new IPv6 packet is forwarded.

The IPv6 packet in this embodiment has the same packet structure as the conventional IPv6 packet, so that the IPv6 packet in this embodiment can be forwarded in the networks like the conventional IPv6 packet. Since the IPv6 packet in this embodiment carries the compressed segment identifiers, under identical network conditions, the IPv6 packet carrying the compressed segment identifiers can improve the forwarding efficiency of the packet can to a certain extent as compared with the conventional IPv6 packet. Moreover, compared with the conventional IPv6 packet, the IPv6 packet constructed based on the compressed segment identifier has a shorter segment routing header, so that the payload efficiency of the packet can be improved, and it is advantageous for the deployment of the SRv6 technique in practical networks.

In an embodiment, by means of the routing method including S210, S220, S230, S240 and S250, the forwarding of the IPv6 packet carrying the compressed segment identifier can be realized. Since the IPv6 packet carrying the compressed segment identifiers has a shorter segment routing header, the payload efficiency of the packet can be improved, and it is advantageous for the deployment of the SRv6 technique in practical networks.

In addition, in an embodiment, the IPv6 packet constructed based on the compressed segment identifier list received at S210, further includes a segment routing header that includes a segment identifier bit-length flag bit and a Segment Left field. When the segment identifier bit-length flag bit is valid, the Segment Left field is indicative of the length of the compressed segment identifier.

It is to be noted that, the segment routing header in this embodiment has the same structure and meaning as the segment routing header in the embodiment shown in FIG. 5, and the structure and meaning of the segment routing header in this embodiment may refer to the related description of the segment routing header in the above embodiments and will not be repeated here to avoid repetition.

In addition, in an embodiment, S230 includes, but is not limited to, the following S231.

At S231, when the function parameter in the local segment identifier entry indicates locator block swapping is to be performed, new destination address information is obtained according to the compressed segment identifier corresponding to the next segment in the compressed segment identifier list and the locator block update parameter, and the destination address information is updated with the new destination address information.

In an embodiment, in a case where the current node is a border node, since the border node is connected to nodes in two SRv6 domains, respectively, and the nodes in different SRv6 domains have block information corresponding to different SRv6 domains, in order to ensure that the IPv6 packet carrying the compressed segment identifiers can be forwarded across SRv6 domains, the border node will maintain a local segment identifier entry including a locator parameter, a function parameter and a locator block update parameter. Upon receiving the IPv6 packet constructed based on the compressed segment identifier list, the border node decapsulates the IPv6 packet, and then re-encapsulates the IPv6 packet with the IPv6 packet header of the next segment, so that the IPv6 packet can be forwarded to the next segment. The IPv6 packet header of the new IPv6 packet shall have correct block information such that the re-encapsulated new IPv6 packet can have a correct destination address for forwarding the IPv6 packet across SRv6 domains by the current border node. Therefore, during the re-encapsulation of the IPv6 packet, the destination address information in the IPv6 packet before decapsulation is matched with the locator parameter in the local segment identifier entry. When the destination address information is consistent with the locator parameter, the type indicated by the function parameter in the local segment identifier entry is determined. The case that the function parameter indicates locator block swapping is to be performed, means that the next segment and the current node are in different SRv6 domains, in that case, the content in the locator block update parameter is read to obtain the block information of the next segment, and the block information is then combined with the compressed segment identifier corresponding to the next segment to obtain new destination address information. The new destination address information, once obtained, may be copied into the destination address information of the IPv6 packet header to form a new IPv6 packet header. Thus, the IPv6 packet is re-encapsulated with the new IPv6 packet header to obtain a new IPv6 packet that can be forwarded to a next segment of an adjacent SRv6 domain. Accordingly, the IPv6 packet constructed based on the compressed segment identifiers can be forwarded from the current SRv6 domain to another SRv6 domain, and the SRv6 technique with higher packet payload efficiency can have a better performance in practical networks.

In addition, in an embodiment, S230 further includes the following S232.

At S232, when the function parameter in the local segment identifier entry indicates locator block swapping is not to be performed, new destination address information is obtained according to the destination address information and the compressed segment identifier corresponding to the next segment in the compressed segment identifier list, and the destination address information is updated with the new destination address information.

It is to be noted that S232 in this embodiment and S231 in the above embodiment are parallel technical schemes.

In an embodiment, in a case where the current node is a non-border node, since adjacent nodes connected to the non-border node are all in the same SRv6 domain, cross SRv6-domain forwarding of the IPv6 packet will not happen, that is, the IPv6 packet forwarded in the same SRv6 domain would have the same block information. Therefore, the non-border node only maintains a local segment identifier entry including a locator parameter and a function parameter. Upon receiving the IPv6 packet constructed based on the compressed segment identifier list, the non-border node decapsulates the IPv6 packet, and then re-encapsulates the IPv6 packet with a new IPv6 packet header, so that the IPv6 packet can be forwarded to the next segment. Since the current non-border node does not forward the IPv6 packet across SRv6 domains, that is, the IPv6 packet forwarded in the same SRv6 domain has the same block information, such that the block information of the current SRv6 domain can be obtained through the destination address information in the IPv6 packet header. Therefore, during the re-encapsulation of the IPv6 packet, the destination address information in the previous IPv6 packet before decapsulation is matched with the locator parameter in the local segment identifier entry. When the destination address information is consistent with the locator parameter, the type indicated by the function parameter in the local segment identifier entry is determined. The case that the function parameter indicates locator block swapping is not to be performed, means that the next segment and the current node are in the same SRv6 domain, the block information corresponding to the current SRv6 domain may be directly obtained through the destination address information in the IPv6 packet header, and the block information is then combined with the compressed segment identifier corresponding to the next segment to obtain new destination address information. The new destination address information, once obtained, may be copied into the DA field of the IPv6 packet header to form a new IPv6 packet header. Thus, the IPv6 packet is re-encapsulated with the new IPv6 packet header to obtain an IPv6 packet that can be forwarded to the next segment. Accordingly, the IPv6 packet constructed based on the compressed segment identifiers can be forwarded in the networks, and the SRv6 technique with higher packet payload efficiency can have better performance in practical networks.

When the border node forwards the IPv6 packet carrying the compressed segment identifiers, the compressed segment identifier corresponding to the next segment is to be converted into the new destination address information according to the local segment identifier entry and the destination address information in the IPv6 packet header. The construction of the local segment identifier entry including the locator block update parameter corresponding to the SRv6 domain will be particularly described below.

Figure 7:
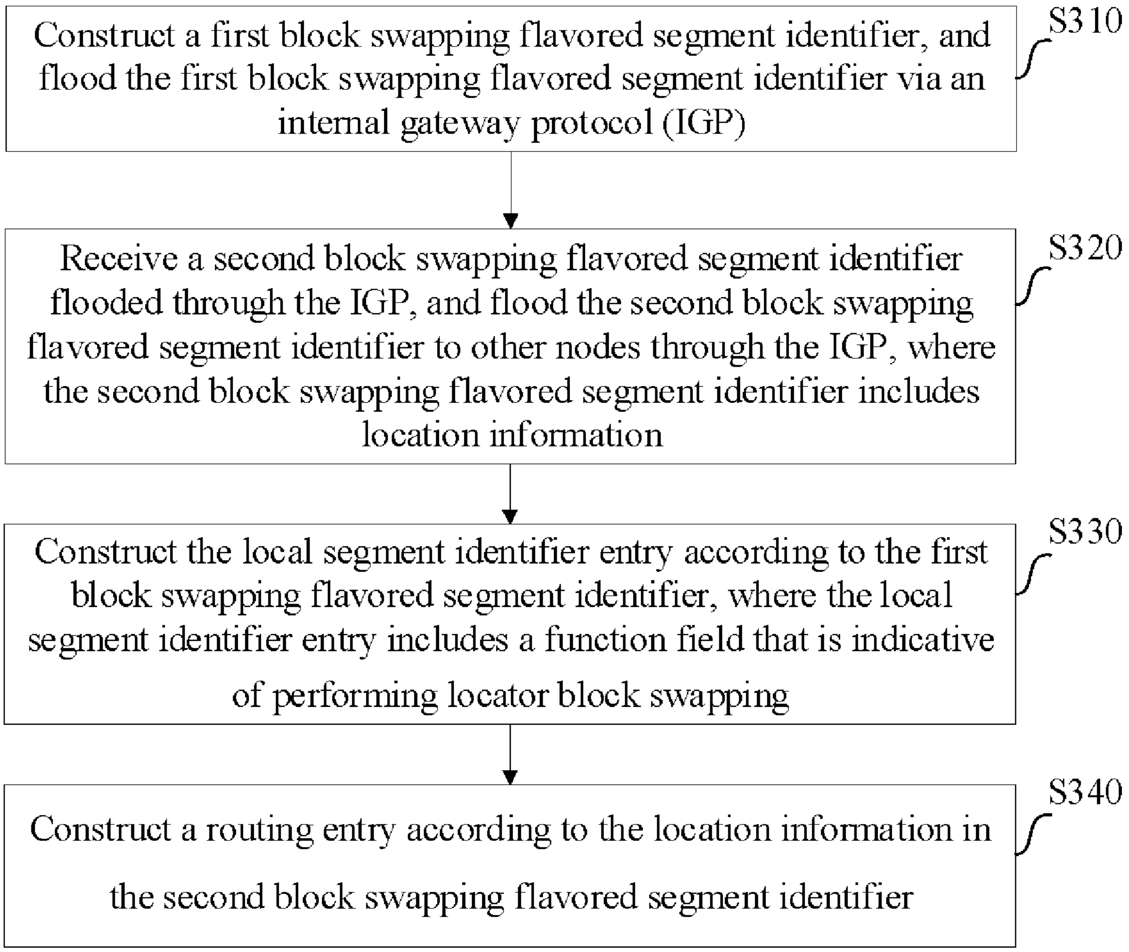
FIG. 7 depicts a flowchart of constructing a local segment identifier entry in the routing method according to another embodiment of the present disclosure.

With reference to FIG. 7, in an embodiment, prior to the forwarding of the IPv6 packet, the routing method further includes the following S310 to S340.

At S310, a first block swapping flavored segment identifier is constructed, and is flooded via an internal gateway protocol (IGP).

At S320, a second block swapping flavored segment identifier flooded via the IGP is received, and the second block swapping flavored segment identifier is flooded to other nodes via the IGP, where the second block swapping flavored segment identifier includes location information.

At S330, the local segment identifier entry is constructed according to the first block swapping flavored segment identifier, where the local segment identifier entry includes a function field indicative of performing of locator block swapping.

At S340, a routing entry is constructed according to the location information in the second block swapping flavored segment identifier.

In an embodiment, before the IPv6 packet is forwarded, each node constructs a first block swapping flavored segment identifier and floods the first block swapping flavored segment identifier via the IGP, so that each node in the current network can obtain the segment identifier information (e.g., location information, function type, etc.) from other nodes. In addition, each node receives the second block swapping flavored segment identifier flooded by other nodes via the IGP. At this time, each node constructs a local segment identifier entry according to the first block swapping flavored segment identifier of the node and constructs an ordinary routing entry according to the location information in the second block swapping flavored segment identifier, so that the IPv6 packet carrying the compressed segment identifiers can be forwarded with the local segment identifier entry and the ordinary routing entry, allowing the SRv6 technique with higher packet payload efficiency to have a better performance in practical networks.

The first and second block swapping flavored segment identifiers are segment identifiers of new function types according to an embodiment of the present disclosure, both of them have the same field structure as the conventional segment identifier, but include a function field that is indictive of the performing of locator block swapping, which is not included in conventional segment identifiers. Similar to conventional segment identifiers, the first and second block swapping flavored segment identifiers may embody in various manners. For example, the first and second block swapping flavored segment identifiers may be endpoint block swapping segment identifiers (END with BS SID) corresponding to the node or layer 3 cross-connect and block swapping segment identifiers (END.X with BS SID) corresponding to the link, where BS is the abbreviation of Block Swapping and means locator block swapping. It is to be noted that, the END with BS SID and END.X with BS SID in this embodiment have values different from those of the conventional endpoint segment identifier (END SID) corresponding to the node and the conventional layer 3 cross-connect segment identifier (END.X SID) corresponding to the link. In addition, the border node is generally assigned with a plurality of block swapping flavored segment identifiers, for example, a block swapping flavor segment identifier END with BS SID sid-12 and a block swapping flavored segment identifier END with BS SID sid-21, where identifier END with BS SID sid-12 indicates that the block information in the block swapping flavored segment identifier is to be swapped from the first SRv6 domain to the second SRv6 domain, and identifier END with BS SID sid-21 indicates that the block information in the block swapping flavored segment identifier is to be swapped from the second SRv6 domain to the first SRv6 domain.

In an embodiment, the construction of the block swapping flavored segment identifier may be performed in various manners. For example, a new flavor type is added to the conventional segment identifier. Specifically, the function type of the conventional segment identifier is modified as an additional locator block swapping sub-function. For another example, a new segment identifier with a function field that is indictive of the performing of locator block swapping is redefined. It is not intended to limit how the construction of the block swapping flavored segment identifier is performed in this embodiment.

In an embodiment, in case that the IGP is an intermediate system to intermediate system (ISIS) protocol, an ISIS message containing the first block swapping flavored segment identifier is flooded such that the first block swapping flavored segment identifier is flooded, and an ISIS message containing the second block swapping flavored segment identifier is received such that the second block swapping flavored segment identifier is received, the ISIS message containing a field indicative of locator block information with locator block swapped.

In an embodiment, a field indicative of the locator block information with locator block swapped, is added in the ISIS message, once the border node configures the block swapping flavored segment identifier and if the IGP is an ISIS protocol, such that the ISIS message can advertise the block swapping flavored segment identifier of each border node to other nodes during flooding, so that each node can store the locator block information with locator block swapped of this node and the locator block information of other nodes, and the forwarding of the IPv6 packet across SRv6 domains can be supported.

The following description will be given by a specific example.

Figure 8A:
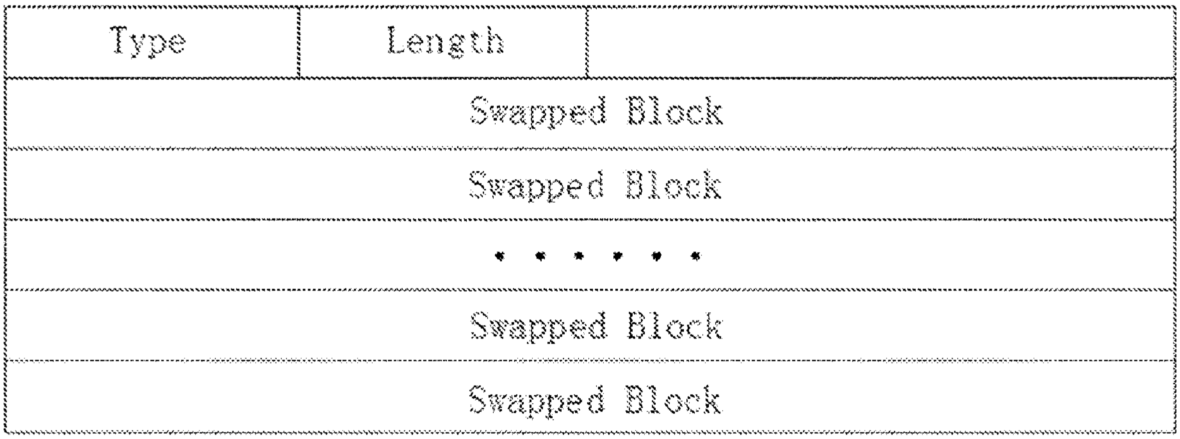
FIG. 8A depicts a schematic diagram of SRv6 SID Swapped Block Sub-TLV according to an embodiment of the present disclosure.

In an example, a field indicative of locator block information with locator block swapped is added in the ISIS message. For example, the Endpoint Behavior field in the SRv6 End SID sub-TLV of an existing ISIS message structure, or the Endpoint Behavior field in the SRv6 End.X SID sub-TLV, or the Endpoint Behavior field in the SRv6 LAN End.X SID sub-TLV, is configured as a function type indicative of the performing of locator block swapping according to various embodiments of the present disclosure, and an SRv6 SID Swapped Block Sub-Sub-TLV is added to the sub-TLVs as described above, and this ISIS message is then flooded. With reference to FIG. 8A, with shows by way of an example the structure of the SRv6 SID Swapped Block Sub-Sub-TLV, and each field in the Sub-TLV structure is explained below:

Type: indicates that this TLV is SRv6 SID Swapped Block Sub-Sub-TLV;

Length: indicative of the length of this TLV; and

Swapped Block: containing new block information with locator block swapped.

In an embodiment, in case that the IGP is an open shortest path first (OSPFv3) protocol, an OSPFv3 message containing the first block swapping flavored segment identifier is flooded such that the first block swapping flavored segment identifier is flooded, and an OSPFv3 message containing the second block swapping flavored segment identifier is received such that the second block swapping flavored segment identifier is received, where the OSPFv3 message containing a field indicative of locator block information with locator block swapped.

In an embodiment, a field indicative of the locator block information with locator block swapped is added in the OSPFv3 message, once the border node configures the block swapping flavored segment identifier and if the IGP is an OSPFv3 protocol, such that the OSPFv3 message can advertise the block swapping flavored segment identifier of each border node to other nodes during flooding, so that each node can store the locator block information with locator block swapped of this node and the locator block information of other nodes, and the forwarding of the IPv6 packet across SRv6 domains can be supported.

The following description will be given by a specific example.

Figures 8B, 8C, 9:
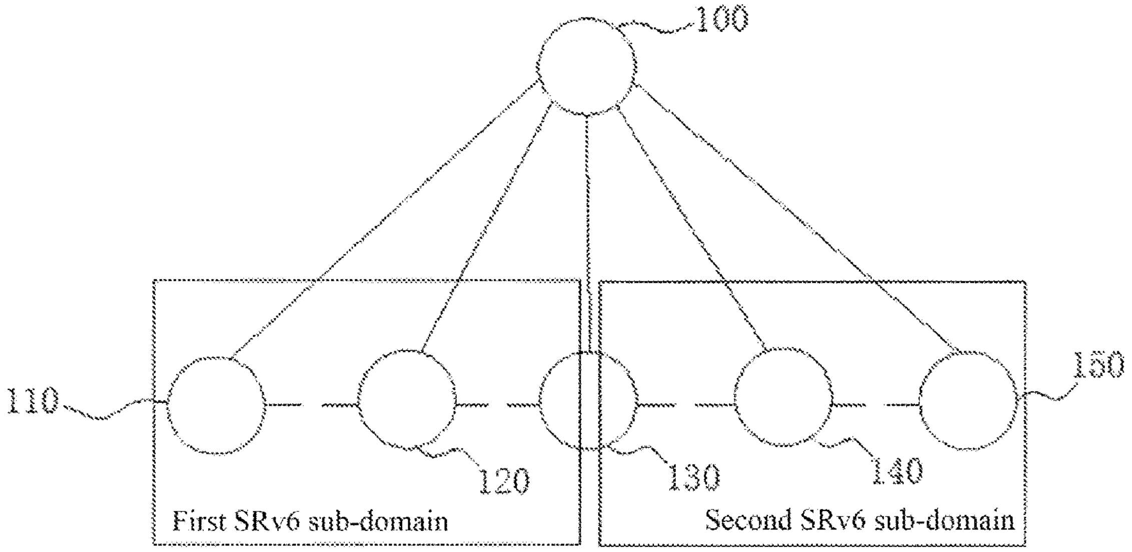
FIG. 8B depicts a schematic diagram of SRv6 SID Swapped Block Sub-TLV according to another embodiment of the present disclosure.
FIG. 8C depicts a schematic diagram of SRv6 SID Swapped Block Sub-TLV according to yet another embodiment of the present disclosure.
FIG. 9 depicts a schematic diagram of a network topology for executing a routing method according to another embodiment of the present disclosure.

In an example, a field indicative of locator block information with locator block swapped is added in the OSPFv3 message. For example, the Endpoint Behavior field in the SRv6 End SID Sub-TLV of the existing OSPFv3 message, or the Endpoint Behavior field in the SRv6 End.X SID Sub-TLV, or the Endpoint Behavior field in the SRv6 LAN End.X SID Sub-TLV, is configured as a function type indicative of the performing of locator block swapping according to various embodiment of the present disclosure, and an SRv6 SID Swapped Block Sub-TLV is added in the sub-TLVs as described above, and this OSPFv3 message is then flooded. With reference to FIG. 8B, which shows by way of an example the structure of the SRv6 SID Swapped Block Sub-TLV, and each field in the Sub-TLV structure is explained below:

Type: indicates that this TLV is SRv6 SID Swapped Block Sub-TLV;

Length: indicative of the length of this TLV; and

Swapped Block: containing new block information with locator block swapped.

In addition, in an embodiment, in addition to flooding its own block swapping flavored segment identifier, each border node will report its own block swapping flavored segment identifier information to the network controller directly, or indirectly through other nodes. Therefore, the routing method further includes the following S400.

At S400, a border gateway protocol-link state (BGP-LS) message containing the first block swapping flavored segment identifier is transmitted to the network controller.

In an embodiment, the BGP-LS message contains a field indicative of locator block information with locator block swapped. For example, the Endpoint Behavior field in the SRv6 Endpoint Behavior TLV of the existing BGP-LS message, or the Endpoint Behavior field in the SRv6 End.X SID TLV, or the Endpoint Behavior field in the SRv6 LAN End.X SID TLV, is configured as a function type indicative of the performing of locator block swapping according to various embodiment of the present disclosure, and an SRv6 SID Swapped Block Sub-TLV is added in the TLVs as described above, and this BGP-LS message is then reported. With reference to FIG. 8C which shows by way of an example the structure of the SRv6 SID Swapped Block Sub-TLV, each field in the Sub-TLV structure is explained below.

Type: indicates that this TLV is SRv6 SID Swapped Block Sub-TLV;

Length: indicative of the length of this TLV; and

Swapped Block: containing new block information with locator block swapped.

The routing method according to the above embodiments will be described below in detail by specific examples.

Example One

As shown in FIG. 9, the network topology includes a network controller 100, and a first node 110, a second node 120, a third node 130, a fourth node 140 and a fifth node 150 which are connected successively. The network controller 100 controls the first node 110, the second node 120, the third node 130, the fourth node 140 and the fifth node 150, respectively. In the network topology shown in FIG. 10, it is assumed that the first node 110 is a source node; the fifth node 150 is an endpoint node; the second node 120, the third node 130 and the fourth node 140 are intermediate nodes; the third node 130 is a border node; the first node 110, the second node 120 and the third node 130 are in a first SRv6 sub-domain; and the third node 130, the fourth node 140 and the fifth node 150 are in a second SRv6 sub-domain. The procedure in which the routing method in the above embodiments is performed based on the network topology shown in FIG. 9, is described below.

The following is the processing by the first node 110.

Firstly, an IPv6 packet carrying a compressed segment identifier is constructed in the first node 110. In the process of constructing the IPv6 packet carrying the compressed segment identifier in the first node 110, the segment identifier bit-length flag bit in the segment routing header is set to be valid throughout the procedure. And since the forwarding path contains the nodes of four segments (i.e., the second node 120, the third node 130, the fourth node 140 and the fifth node 150), the initial value of the Segment Left field is 4. During the construction of the IPv6 packet, firstly, the first node 110 subtracts the value of the Segment Left field by 1, so that the value of the Segment Left field is 3 now. Then, the first node 110 acquires a logically first compressed segment identifier (the node address corresponding to the second node 120) from the segment routing header. Since the segment identifier bit-length flag bit is set to be valid, only the content of the length of one compressed segment identifier is read from the compressed segment identifier list (i.e., the complete content of one compressed segment identifier, e.g., the compressed segment identifier having a length of 32 bits). Then, the first node 110 converts the read compressed segment identifier into a 128-bit segment identifier. During the conversion of the compressed segment identifier, the block information for conversion may be obtained according to the original segment identifier of the first node 110, and the block information is combined with the read compressed segment identifier to obtain the 128-bit segment identifier. In addition, it is also possible to directly utilize the original segment identifier without conversion. The 128-bit segment identifier, once obtained, is copied into the DA field of the IPv6 packet header to form the IPv6 packet carrying the compressed segment identifier. Finally, the first node 110 looks up a routing table according to the DA field of the IPv6 packet header, and forwards the IPv6 packet carrying the compressed segment identifier to the node in a next segment (i.e., the second node 120).

The following is the processing by the second node 120.

The second node 120, after receiving the IPv6 packet carrying the compressed segment identifier, hits the local segment identifier entry of the second node 120 according to the content in the DA field of the IPv6 packet header. At this time, the second node 120 learns from the corresponding function type in the local segment identifier entry that locator block swapping is not to be performed. Therefore, the second node 120 subtracts the value of the Segment Left field by 1, so that the value of the Segment Left field is 2 now. Then, the second node 120 acquires the compressed segment identifier logically corresponding to the value of the Segment Left field from the segment routing header (the node address corresponding to the third node 130). Since the segment identifier bit-length flag bit is set to be valid, only the content of the length of one compressed segment identifier is read from the compressed segment identifier list (i.e., the complete content of one compressed segment identifier, e.g., the compressed segment identifier having a length of 32 bits). Then, the second node 120 converts the read compressed segment identifier into a 128-bit segment identifier. During the conversion of the compressed segment identifier, the block information for conversion is obtained according to the DA field in the IPv6 packet header acquired by the second node 120, and the block information is combined with the read compressed segment identifier to obtain the 128-bit segment identifier. The 128-bit segment identifier, once obtained, is copied into the DA field of the IPv6 packet header to form the IPv6 packet carrying the compressed segment identifier. Finally, the second node 120 looks up the routing table according to the DA field of the IPv6 packet header, and forwards the IPv6 packet carrying the compressed segment identifier to the node in a next segment (i.e., the third node 130).

The following is the processing by the third node 130.

The third node 130, after receiving the IPv6 packet carrying the compressed segment identifier, the third node 130 hits the local segment identifier entry of the third node 130 according to the content in the DA field of the IPv6 packet header. At this time, the third node 130 obtains learns from the corresponding function type in the local segment identifier entry that locator block swapping is to be performed, and the local segment identifier entry provides the block information with locator block swapped. The third node 130 thus subtracts the value of the Segment Left field by 1, so that the value of the Segment Left field is 1 now. Then, the third node 130 acquires the compressed segment identifier logically corresponding to the value of the Segment Left field from the segment routing header (the node address corresponding to the fourth node 140). Since the segment identifier bit-length flag bit is set to be valid, only the content of the length of one compressed segment identifier is read from the compressed segment identifier list (i.e., the complete content of one compressed segment identifier, e.g., the compressed segment identifier having a length of 32 bits). Then, the third node 130 converts the read compressed segment identifier into a 128-bit segment identifier. During the conversion of the compressed segment identifier, the 128-bit segment identifier is obtained according to the block information with locator block swapped provided in the local segment identifier entry and the read compressed segment identifier. The 128-bit segment identifier, once obtained, is copied into the DA field of the IPv6 packet header to form the IPv6 packet carrying the compressed segment identifier. Finally, the third node 130 looks up the routing table according to the DA field of the IPv6 packet header, and forwards the IPv6 packet carrying the compressed segment identifier to the node in a next segment (i.e., the fourth node 140).

The following is the processing by the fourth node 140.

The fourth node 140, after receiving the IPv6 packet carrying the compressed segment identifier, hits the local segment identifier entry of the fourth node 140 according to the content in the DA field of the IPv6 packet header. At this time, the fourth node 140 learns from the corresponding function type in the local segment identifier entry that locator block swapping is not to be performed. Therefore, the fourth node 140 subtracts the value of the Segment Left field by 1, so that the value of the Segment Left field is 0 now. Then, the fourth node 140 acquires the compressed segment identifier logically corresponding to the value of the Segment Left field from the segment routing header (the node address corresponds to the fifth node 150). Since the segment identifier bit-length flag bit is set to be valid, only the content of the length of one compressed segment identifier is read from the compressed segment identifier list (i.e., the complete content of one compressed segment identifier, e.g., the compressed segment identifier having a length of 32 bits). Then, the fourth node 140 converts the read compressed segment identifier into a 128-bit segment identifier. During the conversion of the compressed segment identifier, the block information for conversion is obtained according to the DA field in the IPv6 packet header acquired by the fourth node 140, and the 128-bit segment identifier is obtained according to the block information and the read compressed segment identifier. The 128-bit segment identifier, once obtained, is copied into the DA field of the IPv6 packet header to form the IPv6 packet carrying the compressed segment identifier. At this time, since the value of the Segment Left field is already 0, the segment routing header is removed to form an IPv6 packet. Finally, the fourth node 140 looks up the routing table according to the DA field of the IPv6 packet header, and forwards the IPv6 packet to the node in a next segment (i.e., the fifth node 150).

The following is the processing by the fifth node 150.

The fifth node 150, after receiving the IPv6 packet, hits the local segment identifier entry of the fifth node 150 in the DA field of the IPv6 packet header. At this time, the fifth node 150 learns from the corresponding function type in the local segment identifier entry that locator block swapping is not to be performed. Since the IPv6 packet does not carry the segment routing header, the fifth node 150 processes the IPv6 payload.

In the procedure of forwarding the IPv6 packet carrying the compressed segment identifier, since the IPv6 packet is constructed according to the compressed segment identifier, compared with the conventional IPv6 packet in the SRv6, the IPv6 packet constructed based on the compressed segment identifier has a shorter segment routing header, so that the payload efficiency of the packet can be improved, and it is advantageous for the deployment of the SRv6 technique in practical networks.

Example Two

In a scenario where a Virtual Private Network (VPN) service is deployed in a network, the segment identifier related to the VPN service will be interpolated at the end of the compressed segment identifier list of the segment routing header. In the network topology shown in FIG. 9, the third node 130 is a border node, the first node 110, the second node 120 and the third node 130 are in a first SRv6 sub-domain, and the third node 130, the fourth node 140 and the fifth node 150 are in a second SRv6 sub-domain. All nodes report respective segment identifier configurations to the network controller 100 through BGP-LS messages. Under the cooperation of the network controller 100, an SR-TE path from the first node 110 to the fifth node 150 is established. On this basis, if it is assumed that the fifth node 150 also advertises an Ethernet VPN (EVPN) route containing END.DT2M SID to the first node 110 via a Border Gateway Protocol (BGP), according to the descriptions of the draft-ietf-spring-srv6-network-programming-12 and draft-ietf-bess-srv6-services-02, lower 32 bits of the END.DT2M SID may all be filled with zero. In the subsequent packet forwarding, the END.DT2M SID and the ESI Filtering argument (Arg. FE2) carried by the type 1 route (Ethernet Auto-discovery Route) are combined on the first node 110 to generate a single segment identifier (i.e., a segment identifier related to the VPN service, and the segment identifier is interpolated at the end of the compressed segment identifier list of the segment routing header for horizontal partitioning and other filter mechanisms. Therefore, in the segment routing header encapsulated for the EVPN service packet in the first node 110, for example, the compressed segment identifier list may be (assuming that the compressed segment identifier has a length of 32 bits):

<32bits-block1-END-SID-120, 32bits-block1-END(with BS)-SID12-130, 32bits-block2-END-SID-140, 32bits-block2-END-SID-150, 32bits-block2-END.DT2M-SID, 32bits-Arg. FE2>, where 32bits-block2-END.DT2M-SID is the compressed segment identifier of the END.DT2M SID assigned for the fifth node 150, and 32bits-Arg. FE2 is the parameter for the functional processing of the END.DT2M SID.

In this example, the process of forwarding the IPv6 packet from the first node 110 to the fifth node 150 is similar to the forwarding process in Example one, but the difference between the two examples lie in the two 32-bit elements related to the VPN service in the compressed segment identifier list in this example, so that initial value of the Segment Left field in the IPv6 packet transmitted by the first node 110 is 6. To avoid repetition, the specific procedure of forwarding the IPv6 packet from the first node 110 to the fifth node 150 may refer to the forwarding procedure in Example one and will not be repeated here. The procedure of processing the IPv6 packet by the fifth node 150 will be described below in detail.

When the fifth node 150 receives the packet, the value of the Segment Left field is 2, and the fifth node 150 hits the local segment identifier entry of the fifth node 150 according to the content in the DA field of the IPv6 packet header. At this time, the fifth node 150 learns from the corresponding function type in the local segment identifier entry that locator block swapping is not to be performed. Therefore, the firth node 150 subtracts the value of the Segment Left field by 1, so that the value of the Segment Left field is 1 now. Then, the fifth node 150 acquires the compressed segment identifier logically corresponding to the value of the Segment Left field from the segment routing header, to obtain 32bits-block2-END.DT2M-SID. Since the segment identifier bit-length flag bit is set to be valid, only the content of the length of one compressed segment identifier is read from the compressed segment identifier list (i.e., the compete content of one compressed segment identifier, e.g., the compressed segment identifier having a length of 32 bits). Then, the fifth node 150 converts the read compressed segment identifier into a 128-bit segment identifier. During the conversion of the compressed segment identifier, the block information for conversion is obtained according to the content of the DA field in the IPv6 packet header acquired by the fifth node 150, and the 128-bit segment identifier is obtained based on the block information and the read compressed segment identifier. The 128-bit segment identifier, once obtained, is copied into the DA field of the IPv6 packet header. Then, the fifth node 150 looks up the routing table according to the content in the DA field of the IPv6 packet header and forwards the IPv6 packet. The IPv6 packet in turn hits another local segment identifier entry (i.e., the entry corresponding to END.DT2M SID) in the fifth node 150. At this time, the fifth node 150 subtracts the value of the Segment Left field by 1, so that the value of the Segment Left field is 0 now. Then, the fifth node 150 acquires the compressed segment identifier logically corresponding to the value of the Segment Left field from the segment routing header, to obtain 32bits-Arg. FE2. Next, the fifth node 15 removes the IPv6 packet header and other extended headers (e.g., the segment routing headers), learns the media access control (MAC) original address in an inner layer, and broadcasts to all layer 2 egress interfaces. It is to be noted that, the interface specified in the Arg. FE2 is not included in the broadcast to layer 2 egress interfaces.

In the procedure of forwarding the IPv6 packet carrying the compressed segment identifier as described above, since the IPv6 packet is constructed according to the compressed segment identifier, the IPv6 packet constructed based on the compressed segment identifier has a shorter segment routing header, as compared with the conventional IPv6 packet in the SRv6, so that the payload efficiency of the packet can be improved, and it is advantageous for the deployment of the SRv6 technique in practical networks.

Example Three

Figure 10:
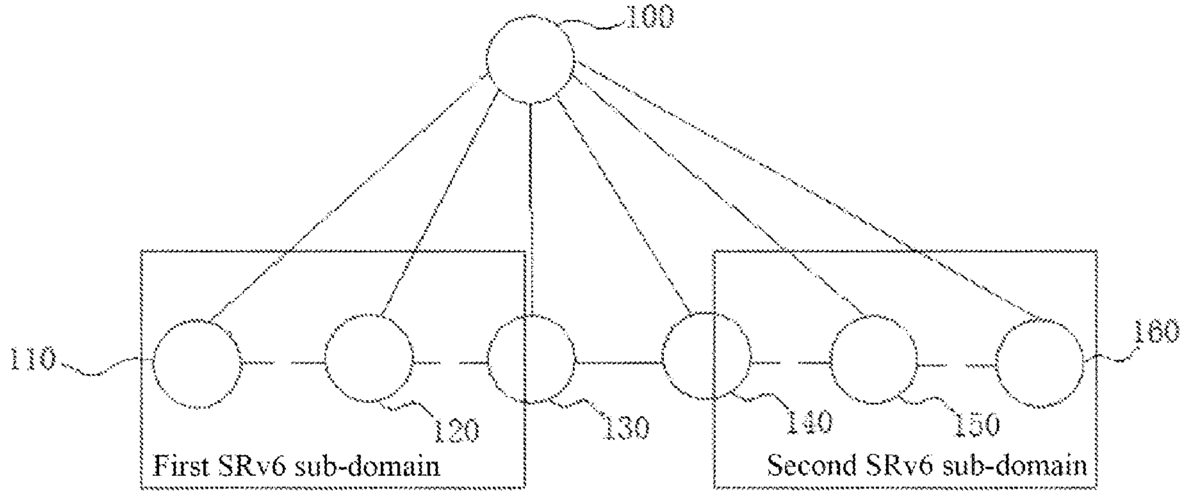
FIG. 10 depicts a schematic diagram of a network topology for executing a routing method according to yet another embodiment of the present disclosure.

For a scenario of transmission across SRv6 domains, the network topology shown in FIG. 10 includes a network controller 100, and a first node 110, a second node 120, a third node 130, a fourth node 140, a fifth node 150 and a sixth node 160 which are connected successively. The network controller 100 controls the first node 110, the second node 120, the third node 130, the fourth node 140, the fifth node 150 and the sixth node 160, respectively. The third node 130 and the fourth node 140 are border nodes, the first node 110, the second node 120 and the third node 130 are in a first SRv6 sub-domain, and the fourth node 140, the fifth node 150 and the sixth node 160 are in a second SRv6 sub-domain. All nodes report respective segment identifier configurations to the network controller 110 through BGP-LS messages. Under the cooperation of the network controller 100, an SR-TE path from the first node 110 to the sixth node 160 is established, where the link formed between the third node 130 and the fourth node 140 may be represented by one END.X with BS SID, e.g., 128bits-block1-END.X(with BS)-SID12-130. In the third node 130, the assigned 128bits-block1-END.X(with BS)-SID12-130 is a block swapping flavored segment identifier, which indicates that the block information with locator block swapped can be obtained according to the 128bits-block2-END-SID-140.

In this example, the network controller 100 may obtain the segment identifier of the third node 130 as 128bits-block1-END.X(with BS)-SID12-130 (i.e., indicating the swapping from the first SRv6 sub-domain to the second SRv6 sub-domain) according to the segment identifier configuration reported by each node. In addition, the network controller 100 may further obtain the segment identifier of the fourth node 140 as 128bits-block2-END(with BS)-SID21-140 (i.e., indicating the swapping from the second SRv6 sub-domain to the first SRv6 sub-domain). Since the END.X with BS SID is routable, in the segment routing header encapsulated in the first node 110, the compressed segment identifier list may be, for example, (assuming that the compressed segment identifier has a length of 32 bits):

<32bits-block1-END-SID-120, 32bits-block1-END.X (with BS)-SID12-130, 32bits-block2-END-SID-150, 32bits-block2-END-SID-160>, where 32bits-block1-END.X(with BS)-SID12-130 represents the link formed between the third node 130 and the fourth node 140.

In this example, the procedure of forwarding the IPv6 packet is similar to those described in the above examples, and will not be repeated here to avoid repetition. The processing the IPv6 packet in the link formed between the third node 130 and the fourth node 140 will be described below in detail.

The third node 130, after receiving the packet, hits the local segment identifier entry of the third node 130 according to the content in the DA field of the IPv6 packet header. At this time, the third node 130 learns from the corresponding function type in the local segment identifier entry that locator block swapping is to be performed, and the local segment identifier entry provides the block information with locator block swapped. Therefore, the third node 130 subtracts the value of the Segment Left field by 1, so that the value of the Segment Left field is 1 now. Then, the third node 130 acquires the compressed segment identifier logically corresponding to the value of the Segment Left field from the segment routing header, to obtain 32bits-block2-END-SID-150. Since the segment identifier bit-length flag bit is set to be valid, only the content of the length of one compressed segment identifier is read from the compressed segment identifier list (i.e., the complete content of one compressed segment identifier, e.g., the compressed segment identifier having a length of 32 bits). Then, the third node 130 converts the read compressed segment identifier into a 128-bit segment identifier. During the conversion of the compressed segment identifier, the block information for conversion is obtained according to the locator block update parameter (e.g., 128bits-block2-END-SID-140) provided in the local segment identifier entry of the third node 130, and the 128-bit segment identifier is obtained based on the block information and the read compressed segment identifier. The 128-bit segment identifier, once obtained, is copied into the DA field of the IPv6 packet header. Next, the IPv6 packet carrying the compressed segment identifier is forwarded to the fourth node 140 along a layer 3 link (i.e., the link formed between the third node 130 and the fourth node 140) indicated by the current local segment identifier entry.

In the procedure of forwarding the IPv6 packet carrying the compressed segment identifier, since the IPv6 packet is constructed according to the compressed segment identifier, the IPv6 packet constructed based on the compressed segment identifier has a shorter segment routing header, as compared with the conventional IPv6 packet in the SRv6, so that the payload efficiency of the packet can be improved, and it is advantageous for the deployment of the SRv6 technique in practical networks.

Figure 11:
FIG. 11 depicts a schematic diagram of a routing apparatus according to an embodiment of the present disclosure.

In addition, with reference to FIG. 11, an embodiment of the present disclosure further provides a routing apparatus, which includes, a memory 1101, a processor 1102 and computer programs stored on the memory 1101 and executable by the processor 1102.

The processor 1102 and the memory 1101 may be connected via a bus or in other ways.

It is to be noted that the routing apparatus in this embodiment can be deployed in different nodes in the embodiment shown in FIG. 1, FIG. 9 or FIG. 10. The node including the routing apparatus in this embodiment can constitute a part of the network topology in the embodiment shown in FIG. 1, FIG. 9 or FIG. 10. These embodiments belong to the same inventive concept, and thus have the same implementation principles and technical effects, and will not be described in detail here.

The non-transitory software programs and instructions for implementing the routing method in the above embodiments are stored in the memory which, when executed by a processor, cause the processor to perform the routing method as described in any one of above embodiments, for example, to perform the S110 to S140 in the method as shown in FIG. 2, S131 to S132 in the method as shown in FIG. 4, S210 to S250 in the method as shown in FIG. 6, or S310 to S340 in the method as shown in FIG. 7.

The apparatus embodiment described above is merely illustrative. The units described as separate components may be or may not be physically separated from each other, that is, they may be located in one place or may be distributed on a plurality of network units. Some or all of the modules may be selected according to practical needs to achieve the purpose of the schemes of the embodiment.

In addition, an embodiment of the present disclosure further provides a non-transitory computer-readable storage medium storing computer-executable instructions which, when executed by a processor or a controller, e.g., by a processor in the embodiment of the routing apparatus, cause the processor to perform the routing method as described in any one of the above embodiments, e.g., to perform S110 to S140 in the method as shown in FIG. 2, S131 to S132 in the method as shown in FIG. 4, S210 to S250 in the method as shown in FIG. 6 and S310 to S340 in the method as shown in FIG. 7.

The embodiments of the present disclosure provide a routing method, a routing apparatus and a non-transitory computer-readable storage medium, which can improve the payload efficiency of the packet and is advantageous for the deployment of the SRv6 technique in practical networks.

The routing method in the embodiments of the present disclosure includes, establishing a forwarding path to a destination node; generating, for each segment in the forwarding path, a compressed segment identifier according to a segment identifier corresponding to a segment in the forwarding path, and establishing a compressed segment identifier list according to each compressed segment identifier; constructing an IPv6 packet based on the compressed segment identifier list; and, forwarding the IPv6 packet. In accordance with the schemes as set forth in various embodiments of the present disclosure, a compressed segment identifier is generated by means of a segment identifier corresponding to each segment in the forwarding path, a compressed segment identifier list is then established according to each compressed segment identifier, and an IPv6 packet for forwarding is constructed according to the compressed segment identifier list. Since the compressed segment identifier is formed by compressing a conventional segment identifier, compared with the conventional segment identifier in the SRv6, the compressed segment identifier has a smaller number of bits. Therefore, the IPv6 packet constructed based on the compressed segment identifier can have a shorter segment routing header as compared with the conventional IPv6 packet in the SRv6, so that the payload efficiency of the packet can be improved, and it is advantageous for the deployment of the SRv6 technique in practical networks.

It should be understood by those having ordinary skill in the art that all or some of the steps in the methods described above and the systems described above may be implemented as software, firmware, hardware and suitable combinations thereof. Some or all of the physical components may be implemented as software executed by processors such as central processors, digital signal processors or microprocessors, or implemented as hardware, or implemented as integrated circuits such as application-specific integrated circuits. Such software may be distributed on a computer-readable medium, and the computer-readable medium may include computer storage mediums (or non-temporary mediums) and communication mediums (or temporary mediums). As well-known to those having ordinary skill in the art, the term computer storage medium includes volatile or non-volatile and removable or non-removable mediums implemented in any method or technology used to store information (such as computer-readable instructions, data structures, program modules or other data). The computer storage medium includes, but is not limited to, RAMs, ROMs, EEPROMs, flash memories or other memory technologies, CD-ROMs, digital video disks (DVDs) or other optical disk storages, magnetic cassettes, magnetic tapes, magnetic disk storages or other magnetic storage devices, or any other mediums that can be used to store desired information and can be accessed by computers. In addition, as well-known to those having ordinary skill in the art, the communication medium generally contains computer-readable instructions, data structures, program modules or other data in modulation data signals such as carriers or other transmission mechanisms, and may include any information transfer medium.

Although some implementations of the present disclosure have been described above, the present disclosure is not limited thereto. Those having ordinary skill in the art may make various equivalent variations or alternations without departing from the scope of the present disclosure, and these equivalent variations or replacements shall fall within the scope defined by the appended claims of the present disclosure.

The invention claimed is:

1. A routing method, comprising:

constructing a first block swapping flavored segment identifier, and flooding the first block swapping flavored segment identifier via an internal gateway protocol (IGP);

receiving a second block swapping flavored segment identifier flooded via the IGP, and flooding the second block swapping flavored segment identifier via the IGP, wherein the second block swapping flavored segment identifier comprises location information; and a function of each of the first and second block swapping flavored segment identifiers comprises any one of, END, END.X, END.T, or END.B6, and each of the first and second block swapping flavored segment identifiers is indicative of block swapping;

constructing a local segment identifier entry according to the first block swapping flavored segment identifier, wherein the local segment identifier entry comprises a function field that is indicative of enabling locator block swapping; and constructing a routing entry according to the location information in the second block swapping flavored segment identifier;

establishing a forwarding path to a destination node;

generating, for each segment in the forwarding path, a compressed segment identifier according to a segment identifier corresponding to a respective one segment in the forwarding path, and establishing a compressed segment identifier list according to each compressed segment identifier;

constructing an IPv6 packet based on the compressed segment identifier list, wherein the IPv6 packet comprises a destination address field;

obtaining a compressed segment identifier from the compressed segment identifier list, converting the compressed segment identifier into a 128-bit segment identifier, and copying the 128-bit segment identifier into the destination address field of the IPv6 packet; and forwarding the IPv6 packet according to the local segment identifier entry and the routing entry;

wherein, the destination address of the IPv6 packet is a segment identifier having 128 bits converted from a first compressed segment identifier in the compressed segment identifier list included in a segment routing header of the IPv6 packet, and the local segment identifier entry is matched and obtained by table lookup according to destination address information of the IPv6 packet, and the local segment identifier entry is constructed according to the first block swapping flavored segment identifier.

2. The routing method of claim 1, wherein each compressed segment identifier comprises at least a node field and a function field, and has a length of less than 128 bits, wherein the node field is indicative of a node corresponding to a respective one compressed segment identifier, and the function field is indicative of an operation to be performed by the node corresponding to the respective one compressed segment identifier.

3. The routing method of claim 1, wherein the constructing of an IP6 packet based on the compressed identifier list comprises, constructing a segment routing header based on the compressed segment identifier list; and constructing the IPv6 packet based on the segment routing header.

4. The routing method of claim 3, wherein the segment routing header comprises a segment identifier bit-length flag bit and a Segment Left field, and the Segment Left field is indicative of the length of the compressed segment identifier in response to the segment identifier bit-length flag bit configured as being valid.

5. A routing method, comprising:

constructing a first block swapping flavored segment identifier, and flooding the first block swapping flavored segment identifier via an internal gateway protocol (IGP);

receiving a second block swapping flavored segment identifier flooded via the IGP, and flooding the second block swapping flavored segment identifier via the IGP, wherein the second block swapping flavored segment identifier comprises location information;

and a function of each of the first and second block swapping flavored segment identifiers comprises any one of END, END.X, END.T, or END.B6, and each of the first and second block swapping flavored segment identifiers is indicative of block swapping;

constructing a local segment identifier entry according to the first block swapping flavored segment identifier, wherein the local segment identifier entry comprises a function field that is indicative of enabling locator block swapping; and constructing a routing entry according to the location information in the second block swapping flavored segment identifier;

receiving an IPv6 packet constructed based on a compressed segment identifier list, the compressed segment identifier list comprising a plurality of compressed segment identifiers each corresponding to a respective one of segments in a forwarding path, and the IPv6 packet comprising destination address information in a destination address field;

matching a local segment identifier entry by table lookup for the destination address information;

obtaining a compressed segment identifier corresponding to a subsequent segment from the compressed segment identifier list, converting the compressed segment identifier into a 128-bit segment identifier according to the local segment identifier entry and the destination address information, and copying the 128-bit segment identifier into the destination address field to update the destination address information;

constructing a new IPv6 packet based on the destination address information as updated; and forwarding the new IPv6 packet according to the local segment identifier entry and the routing entry;

wherein, the destination address of the new IPv6 packet is a segment identifier having 128 bits converted from a subsequent compressed segment identifier in the compressed segment identifier list included in a segment routing header of the IPv6 packet; and the local segment identifier entry is matched and obtained by table lookup according to the destination address information of the IPv6 packet, and the local segment identifier entry is constructed according to the first block swapping flavored segment identifier.

6. The routing method of claim 5, wherein each compressed segment identifier comprises at least a node field and a function field, and has a length of less than 128 bits, wherein the node field is indicative of a node corresponding to a respective one compressed segment identifier, and the function field is indicative of an operation to be performed by the node corresponding to the respective one compressed segment identifier.

7. The routing method of claim 5, wherein the IPv6 packet further comprises a segment routing header, the segment routing header comprises a segment identifier bit-length flag bit and a Segment Left field, and the Segment Left field is indicative of the length of the compressed segment identifier in response to the segment identifier bit-length flag bit configured as being valid.

8. The routing method of claim 5, wherein, in response to the IGP being an intermediate system to intermediate system (ISIS) protocol, flooding an ISIS message containing the first block swapping flavored segment identifier to flood the first block swapping flavored segment identifier, and receiving an ISIS message containing the second block swapping flavored segment identifier to receive the second block swapping flavored segment identifier, wherein the ISIS message contains a field that is indicative of locator block information with locator block swapped; or, in response to the IGP being an open shortest path first (OSPFv3) protocol, flooding an OSPFv3 message containing the first block swapping flavored segment identifier to flood the first block swapping flavored segment identifier, and receiving an OSPFv3 message containing the second block swapping flavored segment identifier to receive the second block swapping flavored segment identifier, wherein the OSPFv3 message contains a field that is indicative of locator block information with locator block swapped.

9. The routing method of claim 5, further comprising, transmitting, to a network controller, a border gateway protocol-link state (BGP-LS) message containing the first block swapping flavored segment identifier and the second block swapping flavored segment identifier, wherein the BGP-LS message contains a field that is indicative of locator block information with locator block swapped.

10. A non-transitory computer-readable storage medium storing at least one computer-executable instruction which, when executed by a processor, causes the processor to carry out the routing method of claim 1.

11. A non-transitory computer-readable storage medium storing at least one computer-executable instruction which, when executed by a processor, causes the processor to carry out the routing method of claim 5.

* * * * *